(12) United States Patent
Gerio et al.

(10) Patent No.: US 8,412,379 B2
(45) Date of Patent: Apr. 2, 2013

(54) ROBOT SYSTEM

(75) Inventors: Gian Paolo Gerio, Grugliasco (IT);
Luca Lachello, Grugliasco (IT);
Fabrizio Romanelli, Grugliasco (IT);
Bruno Cicciarello, Grugliasco (IT);
Michele Fraccaroli, Grugliasco (IT);
Lorenzo Molinari Tosatti, Milan (IT);
Diego Parazzoli, Milan (IT); Ettore Scari, Milan (IT); Matteo Danesi, Milan (IT)

(73) Assignee: Comau S.p.A., Gruglaisco Torino (IT)

( * ) Notice: Subject to any disclaimer, the term of this patent is extended or adjusted under 35 U.S.C. 154(b) by 655 days.

(21) Appl. No.: 12/616,328

(22) Filed: Nov. 11, 2009

(65) Prior Publication Data
US 2010/0145520 A1 Jun. 10, 2010

(30) Foreign Application Priority Data
Dec. 5, 2008 (EP) ..................................... 08425778

(51) Int. Cl.
*G06F 19/00* (2011.01)

(52) U.S. Cl. .......................................... 700/264; 901/1
(58) Field of Classification Search .................. 700/264, 700/245, 248, 253, 257; 318/567, 568.11, 318/568.12, 568.16, 568.21, 568.22; 901/1–6, 901/30, 36, 46
See application file for complete search history.

(56) References Cited

U.S. PATENT DOCUMENTS

| 6,212,443 | B1 | 4/2001 | Nagata et al. | |
|---|---|---|---|---|
| 7,391,178 | B2 * | 6/2008 | Tanaka et al. | 318/568.2 |
| 8,032,253 | B2 * | 10/2011 | Nagata et al. | 700/251 |
| 2005/0244260 | A1 * | 11/2005 | Deplano | 414/730 |
| 2006/0122730 | A1 | 6/2006 | Niemela et al. | |

FOREIGN PATENT DOCUMENTS

WO 2004/030871 A1 4/2004

* cited by examiner

*Primary Examiner* — Dalena Tran
(74) *Attorney, Agent, or Firm* — Young Basile

(57) ABSTRACT

A robot system having a manual guide device connected to the robot in wireless data communication with a portable terminal for use in programming the robot.

19 Claims, 5 Drawing Sheets

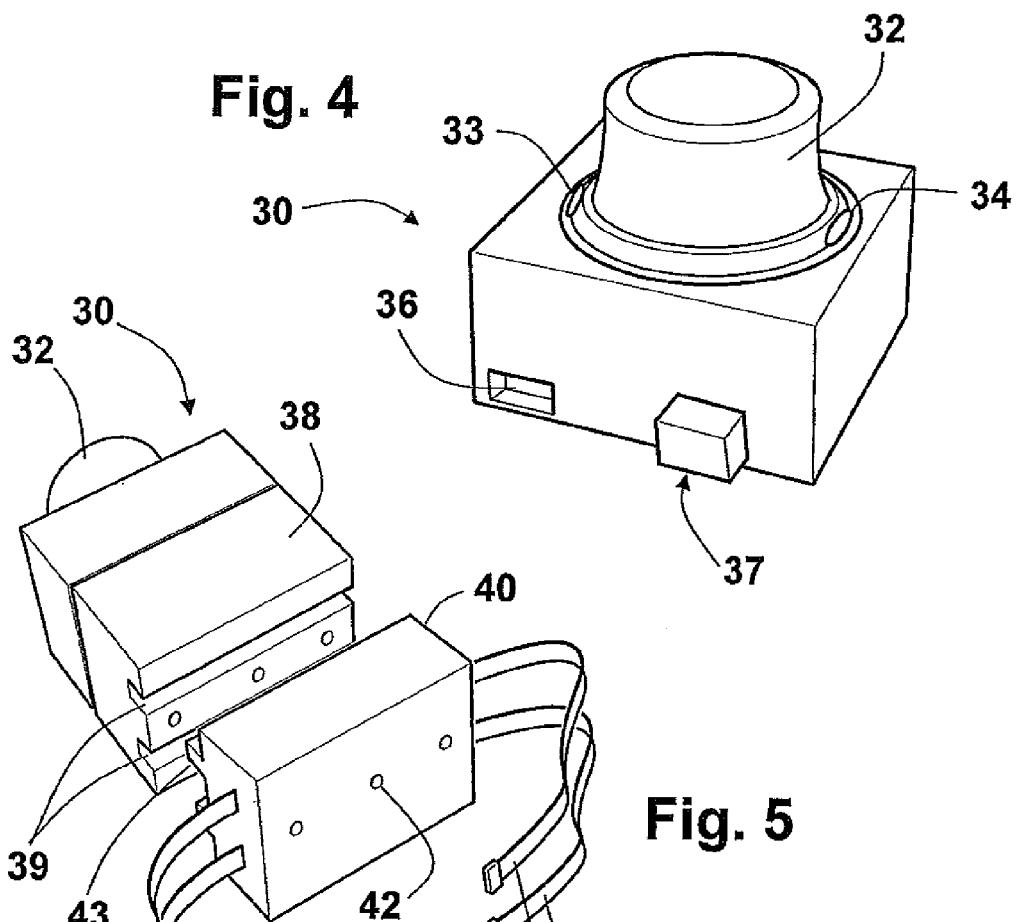
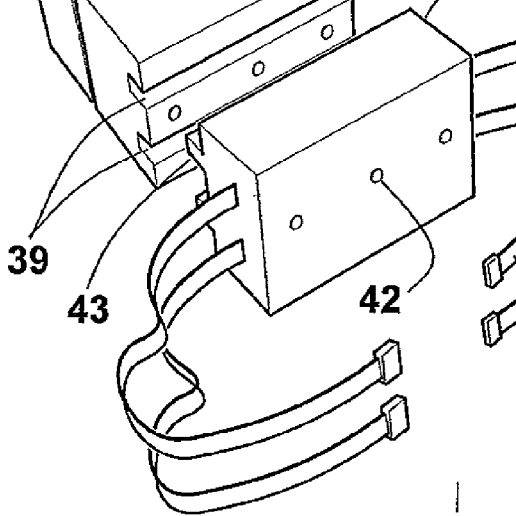
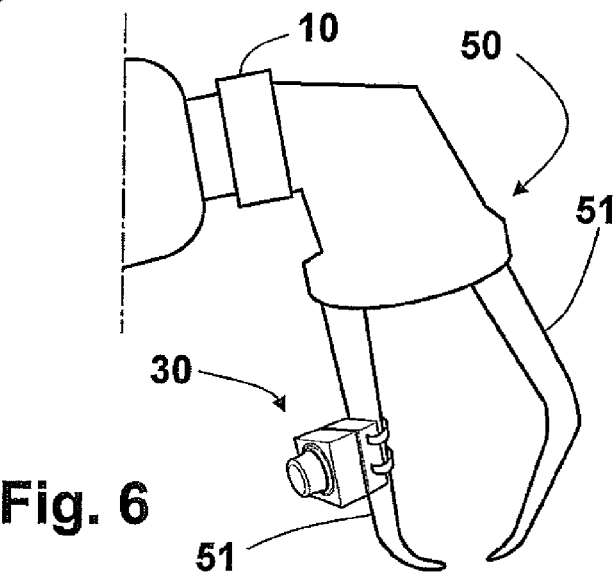

ROBOT SYSTEM

FIELD OF THE INVENTION

The present invention relates to industrial robots and has been developed with particular reference being paid to devices used for carrying out the programming or "teaching" of industrial robots.

BACKGROUND

The activity of programming of a robot basically consists in teaching the robot the path that a point of its movable structure must repeat automatically in the course of the normal working steps, to execute a certain operation. Said point is typically represented by the so-called "Tool Center Point" (TCP), which identifies in general the position of the active part of the tool mounted on the wrist of the robot, i.e., the part that executes the operation and that is defined by an operator in a convenient way according to the application. For example, in the case of an operation of arc welding, the TCP is located on the tip of the welding torch at the end of the welding wire; in sealing applications, the TCP is instead at a nozzle for outlet of the sealant, whilst, for applications that provides for the use of an electric spot-welding gun, the TCP corresponds to one of the two electrodes or an intermediate point between them.

An industrial robot can then operate at least in an automatic mode and in a manual mode, usually selectable on the control unit of the robot. When the manual mode is selected, for example for the purposes of programming or teaching, the robot can be manuevered via commands imparted by a portable programming device, known as "teach pendant". Instead, when the automatic-operating mode is selected, the movement of the robot is governed only by the control unit.

The majority of the programming time is dedicated to manual control of the robot, in order to identify the points deemed optimal of the paths of movement of the TCP, and store the corresponding co-ordinates thereof. For this purpose the teach pendant is used, which typically comprises a display and a series of pushbuttons, used for maneuvering and programming the robot. The teach pendant is in general connected to the control unit by means of a long cable that enables the operator to move into the proximity of the working area of the robot, in order to be able to verify accurately the points and paths of the TCP. Also known are teach pendants connected to the control unit of the robot in wireless mode.

For manual control of the variations of the posture of the robot, the operator uses specific pushbuttons of the teach pendant, known as jog pushbuttons or keys, which govern the movement of one or more axes of the robot. By acting on the jog buttons of the teach pendant, the TCP can be moved in a specific positive or negative direction in the range of a reference system selected by the operator from among a plurality of possible reference systems. In an anthropomorphic robot with six degrees of freedom, there are typically envisaged at least the "Joints", "Base", and "Tool" reference systems, where the "Joints" system is referenced to the joints of the robot (a vector in said system represents the angular positions of each of the joints), and the "Base" and "Tool" systems are cartesian reference systems, the former being referenced to the base of the robot and the latter to the tool mounted on the flange of the wrist of the robot.

In order to follow the TCP closely and make a visual check on positioning thereof, the operator moves continuously around the robot: by so doing, the operator moves evidently also with respect to the origins of the aforesaid reference systems, and this complicates to a certain extent the activity of programming, also in view of the fact that the operator is each time called upon to select the reference system that he wishes to use.

In order to render the activity of programming of the robot more intuitive, it has also been proposed to equip the robot with a manual guide device, mounted directly on the movable structure of the robot. Known devices of this type, generally based upon the use of a force/torque sensor connected to the control unit of the robot or else to the corresponding teach pendant via wired connection, are inconvenient to install, relatively cumbersome and costly, and their modalities of interfacing to the control system of the robot are frequently complex. These disadvantages also have the consequence of rendering the transferability of the guide device from one robot to another laborious, for example in the cases where a number of robots of one and the same working environment are to be programmed.

BRIEF SUMMARY

In the light of what is set forth above, the object of the present invention is basically to provide a robot system equipped with a manual guide device that is easy to install, simple to use, and inexpensive to produce, as well as being convenient and fast to interface to a portable programming terminal or teach pendant. The correlated object of the invention is to provide a manual guide device that can be transferred in a simple and fast way from one robot to another, for the purposes of the corresponding programming operations.

The above and other purposes, which will emerge clearly hereinafter, are achieved according to the invention by a robot system and by a manual guide device for a robot having the characteristics indicated in the annexed claims. The claims form an integral part of the technical teaching provided herein in relation to the invention.

BRIEF DESCRIPTION OF THE DRAWINGS

Further purposes, characteristics and advantages of the present invention will emerge clearly from the ensuing description and the annexed drawings, which are provided purely by way of explanatory and non-limiting example and in which:

FIGS. 4 and 5 are schematic perspective illustrations of two possible practical implementations of a device for manual guiding of the robots of the system of FIG. 1;

FIG. 6 is a schematic view of an example of installation of the device of FIG. 5.

DETAILED DESCRIPTION OF EMBODIMENTS OF THE INVENTION

Figure 1:
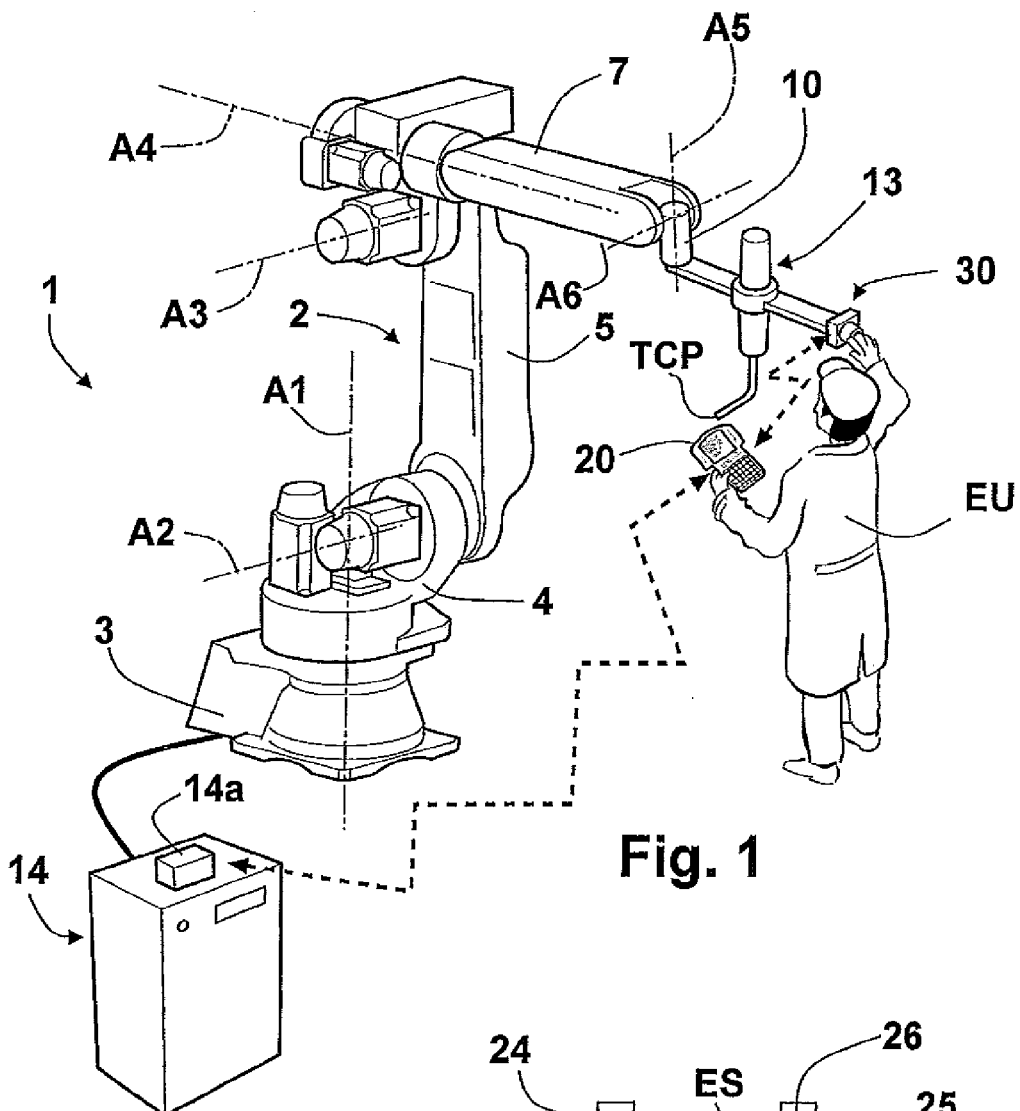
FIG. 1 is a schematic illustration of a robot system according to the invention.

Represented schematically in FIG. 1 is a robot system according to the invention, comprising a robot 1 having a structure 2 that is movable according to a number of degrees of freedom. In the example illustrated, the robot is an anthropomorphic robot having a base 3 and a column 4 mounted so that it can turn on the base 3 about a first axis A1 directed vertically. Designated by 5 is an arm mounted oscillating on the column 4 about a second axis A2 directed horizontally. Designated by 7 is a forearm mounted on the arm 5 about a third axis A3, which is also directed horizontally. The forearm 7 moreover has the possibility of turning about its axis A4, which consequently constitutes a fourth axis of movement of the robot 1, and is equipped at its end with a wrist 10, mounted for the movement according to two axes A5 and A6. Associated to the terminal flange of the wrist 10 is a tool or end effector, designated by 13, which in the example is represented by a welding torch with corresponding wire. As explained in the introductory part of the present description, the end of the end effector 13 constitutes a so-called "Tool Center Point" (TCP).

According to a technique in itself known, the movement of each of the movable parts 4, 5, 7 and 10 of the structure 2 is controlled by a respective electric motor with corresponding gear-reducing transmission. The movements of the structure 2 and the operations of the end effector 13 are managed by a control unit, designated by 14 in FIG. 1, which is in a remote position with respect to the structure 2 and is connected to the latter via a cable 15.

The system moreover comprises a portable programming terminal, or teach pendant, designated by 20, usable by an operator EU for manual programming of the robot 1. The modalities of practical embodiment of the hardware relating to the unit 14 and to the terminal 20, equipped with respective microprocessor control system, are irrespective of the aims of the present description, apart from some aspects indicated hereinafter that regard the invention.

As previously explained, the operator EU can simulate a working step that the robot 1 will then be called upon to perform automatically, varying the posture of the robot via purposely provided movement control means envisaged on the terminal 20, constituted by the so-called jog buttons; via other pushbuttons of the terminal 20 the operator EU can store the co-ordinates of the optimal path identified for the TCP.

Figure 2:
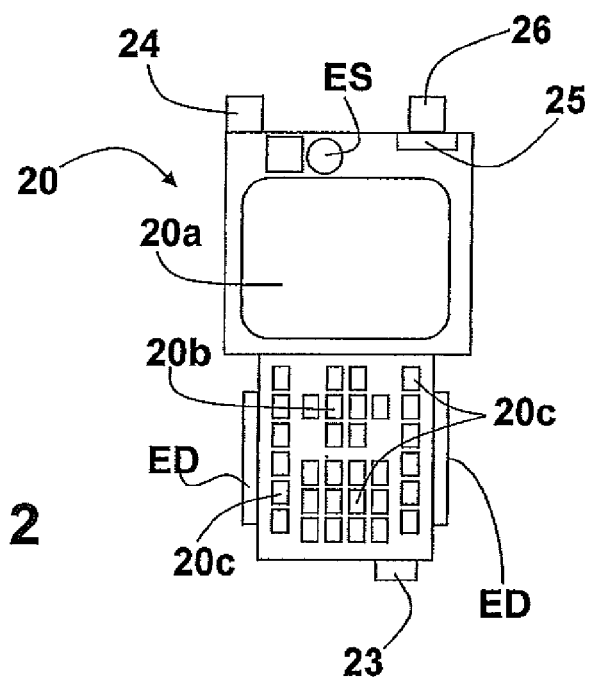
FIG. 2 is a schematic illustration of a portable programming terminal of the system of FIG. 1.

Represented in FIG. 2 in a merely schematic form is an example of teach pendant 20, which comprises at least:

- a display 20a, through which the machine states, the program steps, possible alarms, and various parameters, such as the position of the axes of the manipulator, can be monitored; the display 20a is used both during programming of the positions of the axes and of the movement program steps and as remote monitor of the unit 14;
- a set of keys for governing the movement of the axes of the robot 1, some of which designated by 20b; the keys of said set comprise in particular those for selection of the desired reference system of movement and the jog buttons; and
- a set of programming and editing keys, some of which designated schematically by 20c, used for navigating within the programs displayed on the display 20a, activating the various functions and entering data.

The terminal 20 further comprises an emergency-stop device, designated by ES, which can be constituted by a mushroom-headed pushbutton, set in a fixed position on the front of the terminal. Pressure applied on said pushbutton enables immediate stopping/deactivation of the movement of the robot and/or of the entire operating cell in which the robot operates. The terminal is also equipped with an enabling device designated by ED, which is to be used in combination with the keys of the set 20b during the steps of learning or of manual control of movement of the robot. In practice, the enabling device ED is to be actuated or kept active by the operator, in order to enable the robot 1 to perform the desired movements during programming. In the non-limiting example of FIG. 2, the device ED comprises two keys that extend along the side edges of the terminal 20, but in another possible embodiment the device ED can be located in the rear part of the terminal.

In the example represented, the control unit of the robot and the terminal are prearranged for communicating with one another in wireless mode, and for said purpose are equipped with means for exchange of signals over the air, comprising respective transceiver modules 14a (FIGS. 1) and 24 (FIG. 2). Said modules are sized so as to have a useful range of some meters, and hence fall within the range of the terminal 20 with respect to the unit 14. Transmission over the air of the signals can occur according to any known technique. In a preferred embodiment, the wireless communication between the unit 14 and the terminal 20 occurs in radio frequency, using the transmission system defined by the IEEE 802.11a standard (to which the reader is referred integrally for further details), known as Wi-fi.

The wireless connection between the terminal 20 and the unit 14 basically enables exchange of the following three types of information:

a) operating data, such as information regarding the dimensions of the axes, the jog commands, and in general all the selections that can be made via the terminal 20, as well as downloading of software from the terminal itself to the unit 14; also the unit 14 can send data to the terminal 20, such as information necessary for updating of the display windows on the display 20a, warning codes (alarms, machine states, etc.), uploading of programs, etc.;

b) state of the emergency-stop device ES; and c) state of the enabling device ED.

The terminal 20 further comprises an electrical connector 23, forming part of an arrangement for recharging an internal battery of the terminal, and at least one communication port 25. In a preferred embodiment, the port 25 is a USB port.

The control logic of the system envisages that the jog buttons command each time functions of translation and functions of rotation of axes of the robot 1 with reference to the various possible reference systems, such as those referred to as Joints, Base and Tool, which the operator EU must each time choose and select previously. Said circumstance, as previously explained, can render the activity of programming via the terminal 20 far from intuitive.

For this reason, directly associated to the movable structure 2 of the robot 1 is a manual guide device, to which the invention refers in a specific way and which is designated as a whole by 30 in FIG. 1. The guide device 30 is provided with additional control means, which can be used as an alternative to the jog keys of the terminal or teach pendant 20 for governing the movement of the robot during programming.

Figure 3:
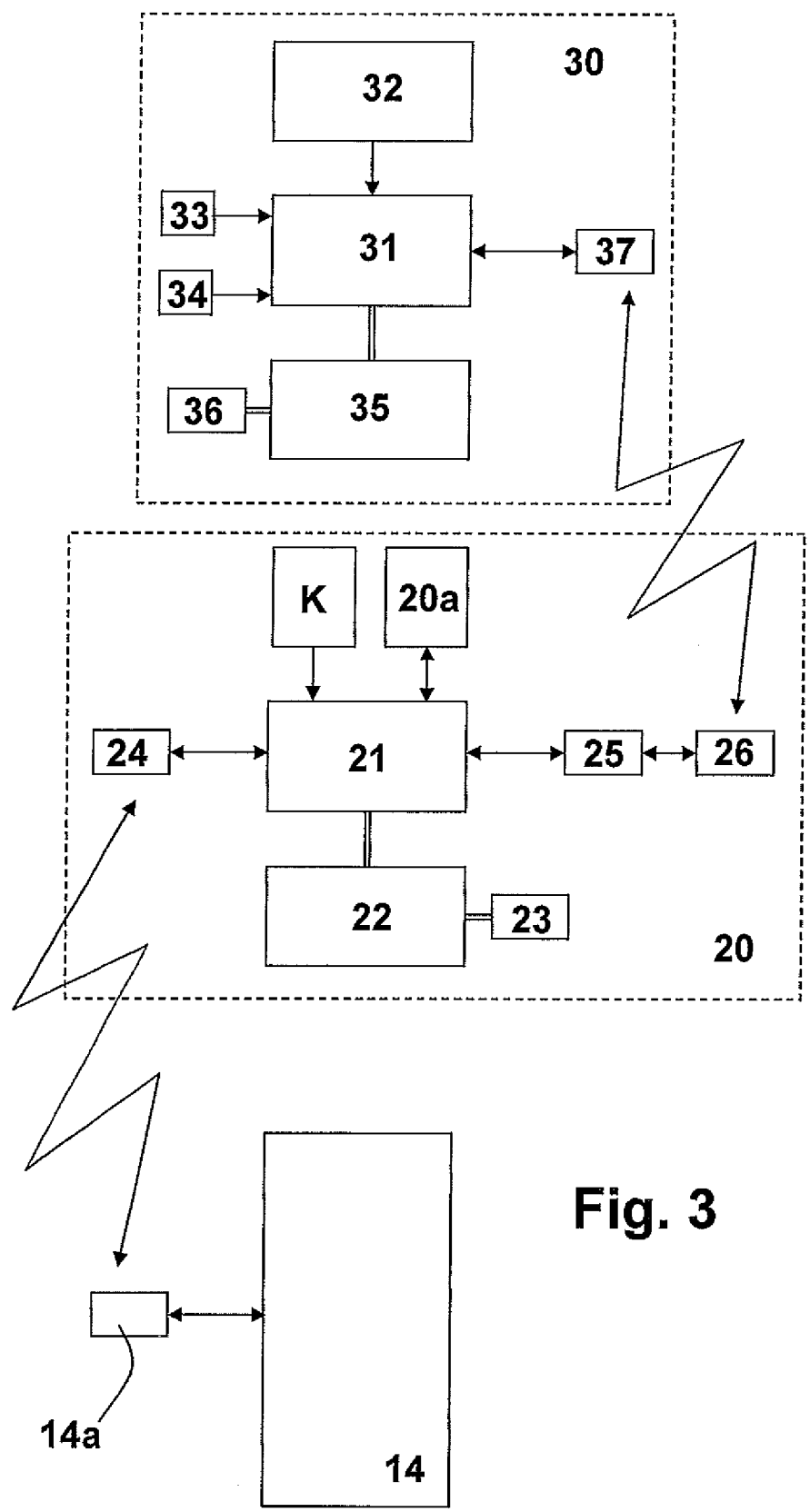
FIG. 3 illustrates with a simplified block diagram of a possible control architecture of a robot of the system of FIG. 1.

Represented via a block diagram in FIG. 3 is an example of the general architecture for control of the robot, including the unit 14, the terminal 20, and the guide device 30.

The guide device 30 has a microprocessor electronic control system, of a programmable type and provided with permanent rewritable memory means, designated as a whole by 31. Preferentially, the circuit is of a miniaturized type, and can be implemented, for example, using a board of a "FOX Board" type, produced by the company ACME Systems Srl, Rome, Italy, to the technical documentation of which the reader is referred for further details. Designated by 32 are the movement control means of the robot belonging to the device 30. In the preferred embodiment of the invention, these means are constituted by a joystick with a number of degrees of freedom, particularly an optical-sensor joystick with six degrees of freedom. Joysticks of the type indicated are commercially available, at contained costs, and are extremely precise. A device usable for this purpose is, for example, the one referred to as SPACE NAVIGATOR™, marketed by the company 3DConnexion GmbH, Seefeld, Germany, to the technical documentation of which the reader is referred for further detail. The device moreover comprises some keys, amongst which, for example, a key 33 for turning on/turning off the device and a storage key 34, usable by the operator EU for storing the coordinates of the points of the path identified for the TCP.

The device 30 further comprises an autonomous supply source 35, such as a battery, which is preferentially of a rechargeable type. For this purpose, the device 30 is also conveniently provided with a connector 36 for connection to a recharging device of a known type, not represented.

According to the main characteristic of the invention, the manual guide device 30 is provided with wireless communication means, in order to set up a wireless communication channel for communication with the portable terminal 20. The communication means comprise for said purpose a first transceiver module on the manual guide device 30 and a second transceiver module on the portable terminal 20.

The first wireless transceiver module is designated by 37 in FIG. 3 and is connected to the control system 31. In a preferred embodiment of the invention, the module 37 is prearranged for operating according to the Bluetooth standard and can be implemented by any transceiver suited for the purpose. The use of Bluetooth technology proves particularly advantageous both as regards the easy traceability and the contained cost of the transceivers and because the typical mode of operation envisaged by the Bluetooth standard enables containment of the levels of consumption of electrical energy by the device 30.

In a possible practical embodiment, the module 37 can be of the "key" type in order to enable connection to the control system 31 exploiting a communication port of the latter, particularly a USB port; in an example, the module 37 will have a USB plug, and the aforesaid port will have a USB socket. In such a case, the control system 31 of the device 30 is preferentially configured for effecting installation of the peripheral represented by the module 37 via the plug-and-play technique. It should on the other hand be borne in mind that the module 37, irrespective of its practical implementation, does not necessarily have to be associated to the device 30 in a removable way.

Also the terminal 20 is provided with a corresponding microprocessor programmable electronic control system, designated by 21, equipped with corresponding memory means, to which the various keys of the device (designated as a whole by K in FIG. 3) and the display 20a are interfaced in a known way, the latter possibly being implemented with touch-screen technology.

As already mentioned, the terminal 20 has a corresponding autonomous supply source 22, such as a battery, preferentially of a rechargeable type and with a connector 23 for connection to a suitable recharging arrangement (not represented).

Associated to the control system 21 are first transceiver means for wireless signals, designated by 24, for communicating with similar transceiver means 14a of the control unit 14 of the robot 1. As already explained, these transceiver means operate, in a possible embodiment, according to the Wi-fi communication standard.

The control system 21 of the terminal 20 is moreover provided with at least one communication port 25 accessible from outside the teach pendant, preferably of a USB type. It should be noted that practically all teach pendants commonly used in combination with industrial robots are provided with at least one accessible communication port.

Connectable in a removable way to said port 25 is the second transceiver module, designated by 26, forming part of the communication means provided to enable dialogue in wireless mode between the device 30 and the terminal 20.

Consequently, in the example considered, the module 26, which can be implemented via any transceiver suited to the purpose, operates according to the Bluetooth standard. In the preferred embodiment of the invention, the module 26 is of the "key" type in order to enable connection to the control system 21, exploiting the communication port 25. As has been said, the port 25 is preferably of a USB type, in which case the module 26 will preferentially have a USB plug and the port 25 will have a USB socket. Preferably, the control system 21 of the terminal 20 is configured to enable installation of the peripheral represented by the module 26 via the plug-and-play technique.

Illustrated in FIG. 4 is a possible practical embodiment of the device 30, which comprises a casing of a prismatic shape, housed within which is the corresponding control system, and mounted on which is the joystick 32 with six degrees of freedom, with the keys 33 and 34, the recharging connector 36, and the transceiver module 37. As has been said, the control circuit of the device 30 is of a miniaturized type so that the dimensions of its casing are small, indicatively less than 10 cm in the three dimensions.

The device 30 is provided with means for its coupling, at the axis A6, to one of the movable structure 2 and the end effector 13 of the robot 1, said means being preferably configured to enable a fast coupling or assembly. In the embodiment exemplified in FIG. 5 an assembly base 40 is purposely provided, equipped with straps or clamps 41 for fast fixing to the structure of the robot or directly to the tool (of course, instead of clamps, other means of assembly can be used, such as for example adjustable collars).

Exemplified, for instance, in FIG. 6 is the coupling of the guide device 30 to one of the electrodes 51 of a welding gun 50 mounted on the wrist 10 of the robot. In the case of FIG. 1, instead, the device 30 is fixed to the support of the torch 13 via screws, for example exploiting the presence of purposely provided holes 42 made in the base 40 or in a base of the casing of the device 30.

In the example of FIG. 5, the casing of the device 30 has a respective base 38 that defines one or more engagement seats 39 designed to receive respective portions 43 of the assembly base 40, with a substantially slide-type coupling. Secure fixing between the bases 38 and 40 can be guaranteed by snap-action or spring-action couplings.

The guide device 30 can be used in the case where it is intended to facilitate programming of the robot, via means alternative to the jog keys of the terminal 20, simplifying also movement of the robot in its range of application. Preferentially, the movement of the robot 1 by means of the device 30 occurs in a cartesian reference system, i.e., in the "Tool" reference system, in a way independent of the reference system possibly selected for the terminal 20. In other words, the movement of the TCP determined by actuation of the joystick 32 is not affected by the current setting of the jog keys, so that it is sufficient for the operator EU to actuate the joystick 32 in the desired direction in order to produce a corresponding movement of the robot 1. It should in any case be noted that the joystick is a control means additional to the jog keys: consequently, the movement of the TCP to reach the desired point can always be governed by the operator EU using the teach pendant, after prior selection of the desired reference system.

Using the joystick device it is possible to move the TCP of the robot 1 in all the directions of the "Tool" reference system (and following all the rotations). In a preferred embodiment of the invention, it is possible, using the teach pendant, to block some movements (blocking the degrees of freedom), with the possibility of moving the robot along a plane or a straight line, possibly also in a reference system different from the "Tool" reference system, previously selectable according to an appropriate procedure on the terminal 20.

As has been said, the joystick has preferentially six degrees of freedom. For example, by exerting a pressure or else a pulling action on the knob of the joystick 32, an advance or a recession of the TPC is obtained; by pressing the knob to the right or to the left, a displacement to the right and to the left, respectively, of the TCP is obtained. Likewise, by pushing the knob down or up, the corresponding movements of the TCP are obtained. The knob can likewise be turned in a clockwise direction and in a counterclockwise direction to obtain movements of rotation of the TCP, or else be inclined to obtain inclinations of the TCP in the desired direction.

As previously explained, in a possible embodiment of the invention the device 30 communicates with the terminal 20 through a Bluetooth system, which guarantees low consumption levels, using the UDP (User Datagram Protocol). The communication protocol is preferentially a dedicated protocol, based upon encapsulated messages as body of a UDP packet.

The practical modes of implementation of the communication between the device 30 and the terminal 20, as well as between the latter and the control unit 14 of the robot, can be of any type.

In general terms, the terminal 20 operates alternatively as client and as server in regard to the guide device 30. The terminal 20 behaves as UDP client in regard to the device 30 for the messages of initial configuration and messages of movement, requesting at each instant—for example, every 10 ms—the position of the knob of the joystick 32, with the corresponding control system that responds in a synchronous way. With a touch or release of the knob of the joystick by the user, detected by the control system 31 of the device 30, this sends a message of activation to the terminal 20, which in this case behaves as UDP server for the messages of action, i.e., control of the displacement of the robot.

The modalities of communication between the terminal 20 and the control unit 14 of the robot is substantially analogous to the one described above, but the terminal 20 behaves always as a UDP client for the messages of configuration and movement, whereas the control unit 14 is configured for handling a task that is launched at start-up of the system with the UDP server in listening mode. The aforesaid task in the unit 14 is provided for handling the messages of interchange between the task of communication present on the terminal 20 (which behaves as client) and the task on the unit 14 (server). The task on the unit 14 is configured for establishing whether, in the communication when waiting for a message there occurs a timeout or an error in reception, and makes a series of attempts in such a way as to be able to guarantee a percentage of error in reception such as not to have an adverse effect on the performance of the communication. Upon receipt of a packet of an action type (movement of the robot), the server process responds to the terminal 20 with a message containing the current position of the TCP and the state of the enabling device ED of the terminal.

In the case where via the terminal 20 deactivation of the guide device 30 is requested, the corresponding module is deactivated within the interpolator of the control 14; otherwise, the system activates the device 30. During the step in which in the system device 30—terminal 20 carries out polling to supply the current position to the control 14, the server on the control 14 receives the data regarding the position reference of the device 30 and responds to the task client on the terminal 20 with the current position of the TCP, from which the reference systems commonly active on the system have previously been removed. Finally, the task client on the terminal 20 requests at a regular rate from the task server the reference systems active on the system, which are, however, used in combination with the device 30 only for management of possible advanced movements, as has been said previously (blocking of the degrees of freedom).

The part of communication between the teach pendant 20 and the control unit 14 can be basically divided into two parts. The part of the communication between the user interface (display) of the terminal 20 and the device 30, and the part for management at a lower level of the communication and handshaking between the terminal 20 and the device 30, and between the terminal 20 and the control unit 14. The first part concerns the exchange of information that occurs between the user interface of the teach pendant (hence, for example, information regarding the state of the system, the configuration, and set-up of the device), is established upon start-up of the system and updating of the data between the teach pendant and the guide device, and is performed whenever the graphic interface on the teach pendant requests an updating of the data to be displayed, or when there are entered from the user interface configuration values that are to be passed to the guide device 30.

The second part of the communication between the teach pendant and the device 30 is, instead, as has already been said, at a lower level and deals prevalently with the initialization part of the communication (start-up of the Bluetooth protocol and adaptation to the TCP/IP protocol with the Bluetooth Network Encapsulation Protocol—BNEP) and the part of renewal of the connection between the device 30 and the terminal 20 and between the terminal 20 and the control unit 14. All the messages that regard the movement and updating of the reference systems are managed by this task on the terminal 20.

Thanks to its own microprocessor control system, the device 30 is configurable, in so far as, in the communication protocol, different messages can be integrated for entering the parameters of the guide device. Preferentially, there is envisaged the possibility of configuring the position of the device 30 with respect to the axis A6 of the robot, the maximum speeds and the accelerations that may be allowed for translations and rotations, the number and the gear-reducing ratio, the limitation of the degrees of freedom, and the configuration of the reference systems.

In the preferred embodiment, integrated in the control logic of the system is a calibration procedure controllable by means of the terminal 20, which enables configuration of the guide device 30 in any point of the "Tool" system of coordinates starting from the axis A6 of the robot. The procedure is preferentially guided via the display of the teach pendant, through which there is first requested positioning of the robot 1, by a command issued by the device 30, in a position such that a side face of the casing of the device itself is substantially parallel to the base 3 of the robot or to the ground; in this a way, the calibration procedure can occur more easily. Next, the system requests the user, once again via the display of the teach pendant, to act on the joystick 32 in such a way as to cause displacements in the directions X, Y, Z of the "Base" reference system in such a way as to be able to calculate the conversion of coordinates between the "Tool" reference system of the device 30 and the "Base" reference system of the robot. If the procedure of acquisition of the directions has been performed correctly, the system sends back on the display a message to indicate that calibration has been performed and in this way it will be possible to use the device 30 in the position just calibrated. Of course, it is possible to execute the calibration procedure for "n" possible points of installation of the device 30 on the robot, and each configuration will preferentially be saved on the unit 14 and not on the device 30, which can be used also on robots different from the one currently being programmed.

To guarantee coupling of the terminal 20 with the manual guide device 30, it is necessary for the Bluetooth transceiver modules to be uniquely identified. The unique coupling between the device 30 and the terminal 20, purposely configured, is guaranteed through a pairing procedure that envisages scanning by the terminal, via the corresponding module 26, of the Bluetooth network so as to identify the Bluetooth devices present. The device 30 responds to the scanning, via the corresponding transceiver module 37, with an identifier or information of identity that coincides with the identifier or information of identity of the module 26 paired with the terminal 20. Preferentially, said identifier is represented by the MAC address of the module 26 of the terminal 20. The terminal is able to query the corresponding transceiver module 37 to identify the aforesaid identifier and to enable pairing or otherwise. The uniqueness of the identifier evidently guarantees the uniqueness of the pairing.

In normal use, the device 30 is mounted on the robot 1, in a position corresponding to the axis A6, for example directly on the end effector 13. Next, the logic pairing and calibration procedures described above are performed. Next, the robot 1 can be manuevered by the operator EU by directly acting on the joystick 32, as described previously. As explained, the possibility of maneuvering the robot 1 using the device 30 depends always and in any case upon the state of activation of the enabling device ED provided on the terminal 20.

From the foregoing description, the characteristics of the present invention emerge clearly. The manual guide device proposed is simple and economically advantageous to produce and ensures precise and reliable operation. The fact that the device is provided with means for establishing a wireless communication with a teach pendant renders transportability or transferability of the device between different robots to be programmed very convenient and fast. As has been said, the fact that practically all the teach pendants for industrial robots are provided with at least one communication port renders implementation of the invention very easy, it being sufficient to combine with such a port a module of the wireless communication system. Of course, the absence of a cable between the teach pendant and the manual guide device has also the practical advantage of facilitating the displacements of the operator in the proximity of the TCP.

The contained dimensions of the device and the provision of coupling means of a substantially fast-coupling type further facilitate the transportability of the device itself and, in addition to facilitating its installation, enabling positioning of the device in various possible positions on the robot.

Figure 7:
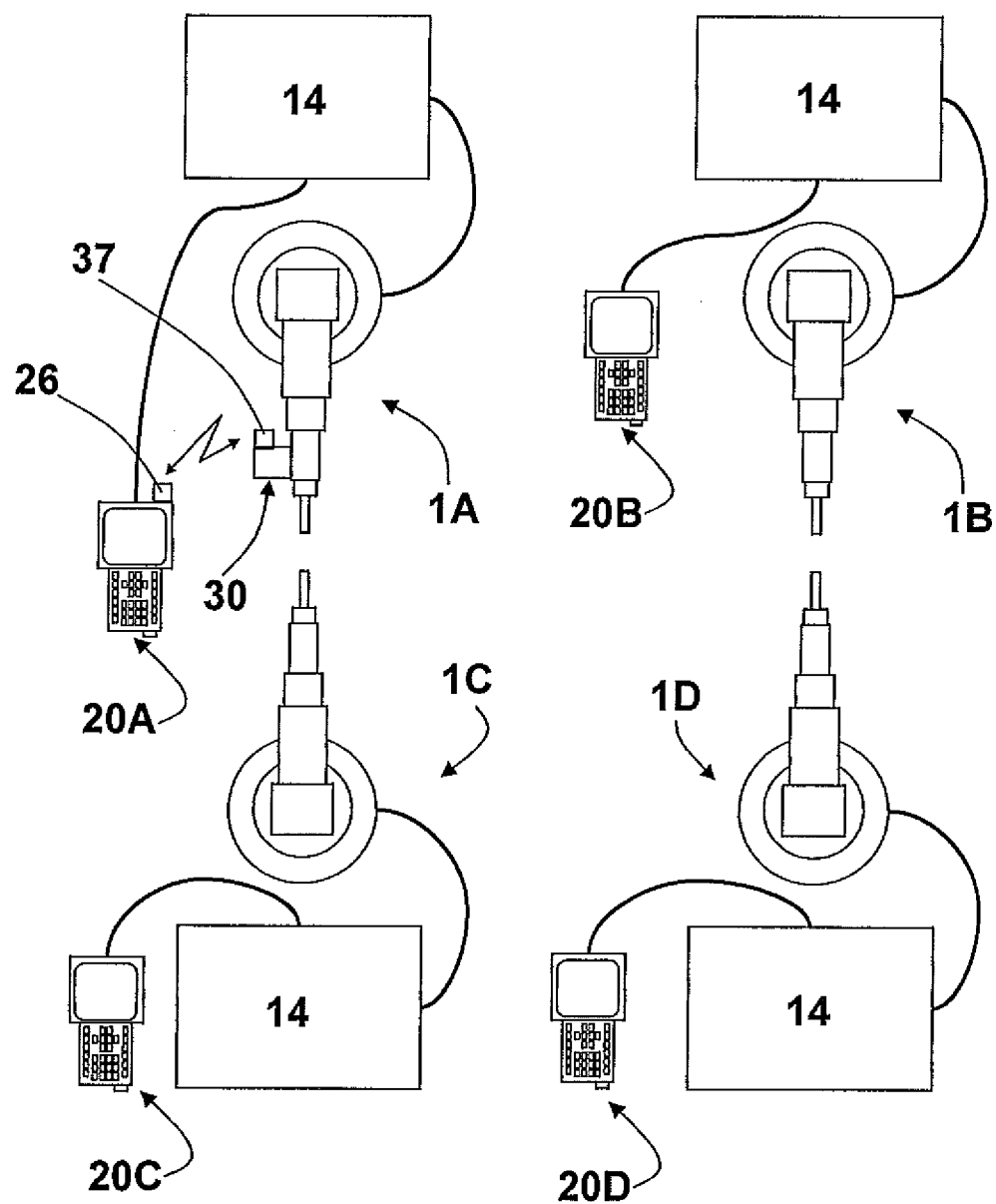
FIGS. 7 and 8 are schematic representations in plan view of two machining cells, each implementing a robot system according to the invention.
Figure 8:
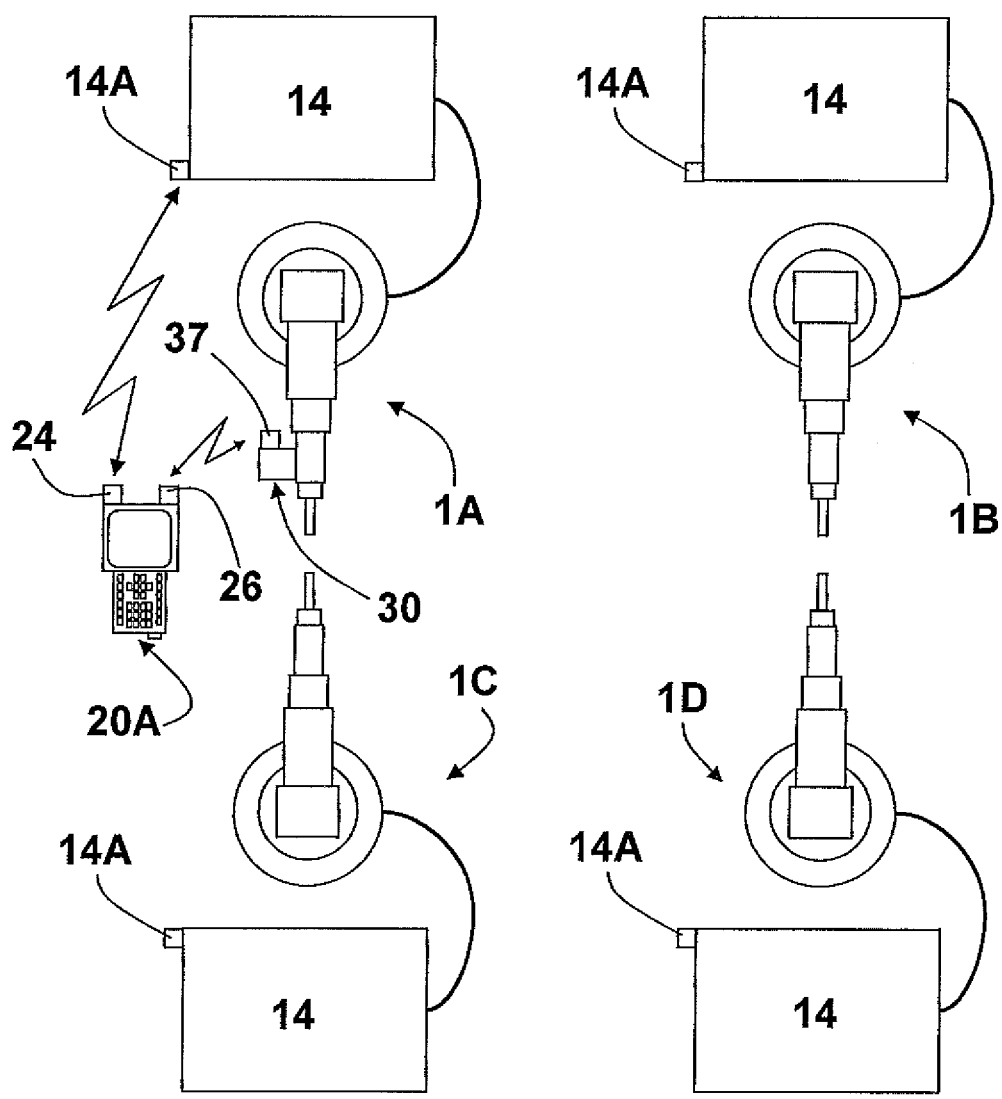

The advantages in terms of transportability of the device 30 are highlighted in FIGS. 7 and 8.

Illustrated schematically in FIG. 7 is a working cell that comprises a plurality of robots 1A, 1B, 1C, 1D, each equipped with a respective control unit 14. In the example of FIG. 7, each unit is wire connected to a respective terminal or teach pendant 20A, 20B, 20C, 20D. As may be appreciated, thanks to the present invention, the guide device 30 previously described can be used for programming any of the robots (the robot 1A, in the example illustrated), and then be transferred and interfaced in a simple and fast way to other robots of the plurality (1B, 1C, 1D), for the corresponding programming, and so forth for the other robots. For this purpose, it is in fact sufficient to uncouple the device 30 from the robot 1A, and then mount it on a different robot of the cell, for example, the robot 1B, as well as transfer the transceiver module from the teach pendant 20A to the teach pendant 20B in order to carry out then the procedures of pairing and calibration described.

Even more convenient is the case where the working cell is provided with a single teach pendant of a wireless type, of the sort that can be coupled selectively to any of the control units 14, as schematically illustrated in FIG. 8. A technique that can be used for this purpose is the one described in the document No. EP-B-1 716 983 (with particular reference to the connection defined as "Main" in said document), the subject matter of the claims of which is considered as being incorporated herein.

In this application, the manual guide device 30 can always remain paired to one and the same teach pendant 20, whereas the latter can be selectively coupled to each of the robots 1A, 1B, 1B, 1C of the cell. Hence, for such an application, it is sufficient to uncouple the device 30 from the robot 1A, then mount it on a different robot of the cell, for example, the robot 1B, and then carry out the calibration procedure described.

It will moreover be appreciated that, for an application of this sort, the communication module 26 of the teach pendant 20 does not have to be necessarily of a removable type, it being in fact possible to integrate it directly in the teach pendant.

Previously, reference has been made to Bluetooth technology for the purposes of implementation of the communication between the teach pendant 20 and the manual guide device 30, but it is clear that it is possible to implement for the purpose a radio frequency communication network in compliance with other specifications, such as ZigBee, Wi-fi, Bluetooth, Z-Wave or some other wireless protocol of a standard or proprietary type.

Finally, it will be appreciated that, if the teach pendant is provided with means for communicating in wireless mode with the corresponding robot control unit and if said means are based upon the same communication technology as the one implemented in the device 30, no additional wireless communication means are required for the terminal, such as the second communication module 26. For example, in the case of the teach pendant of FIGS. 1 and 2, the transceiver module 37 of the guide device 30 could operate according to the Wi-fi standard, in which case the transceiver means 24 of the teach pendant 20, used for dialoguing with the control unit 14, can advantageously be exploited also for dialoguing with the manual guide device 30. Obviously, for an application of this sort, there will in any case be provided a procedure for pairing in a unique way the teach pendant 20 and the device 30, comprising, for example, the exchange of at least one piece of information of identity between the two devices to be connected.

What is claimed is:

1. A robot system that comprises:
   at least one robot having a control unit and a movable structure, to which an end effector can be associated;
   at least one portable programming terminal in data communication with the control unit, including a manually actuatable enabling device for enabling control of displacements of the movable structure of the robot; and a manual guide device for manually controlling movements of the moveable structure of the robot, the manual guide device having a connection structure for attaching the manual guide device to at least one of the movable structure and the end effector of the robot, wherein the manual guide device has a wireless communication system to set up a wireless communication channel for communication with the portable terminal, the communication system comprising a first transceiver module on the manual guide device and a second transceiver module on the portable terminal; and wherein at least the second transceiver module is prearranged for physical and removable connection to the portable terminal.

2. The system according to claim 1, comprising a plurality of robots, wherein the wireless communication system is prearranged for the selective connection in wireless mode of the manual guide device to the portable terminal that is in data communication with the control unit of any of the robots of said plurality that is to be programmed.

3. The system according to claim 2, wherein the portable terminal comprises a first wireless communication system, to set up said wireless communication channel with the wireless communication system of the manual guide device, and a second wireless communication system, the control units of the robots of said plurality are provided with respective wireless communication system to set up a second communication channel with the second communication system, and the portable terminal is selectively connectable in wireless mode through the second communication channel to the control unit of any robot of said plurality that is to be programmed.

4. The system according to claim 1 wherein the first transceiver module is prearranged for physical and removable connection to the portable terminal.

5. The system according to claim 4, wherein the communication system is prearranged to set up a uniquely paired connection between the manual guide device and the portable terminal.

6. The system according to claim 5, wherein
one of the first and second transceiver modules contains information of identity of the other of the first and second transceiver modules, particularly corresponding to a MAC address; and
the manual guide device and the portable terminal are configured in such a way that, in the course of a pairing procedure necessary for enabling a session of use of the manual guide device, said information of identity is communicated from one transceiver module to the other.

7. The system according to claim 1 wherein the connection structure of the manual guide device comprises a fast-connection structure.

8. The system according to claim 1 wherein the manual guide device comprises a joystick.

9. The system according to claim 8 wherein the joystick is an optical-sensor joystick with six degrees of freedom.

10. The system according to claim 1 wherein the portable terminal comprises a microprocessor electronic control system having at least one communication port, to which the second transceiver module is removably connected thereto.

11. The system according to claim 10 wherein the at least one communication port is a USB port.

12. The system according to claim 1 wherein the manual guide device is provided with an autonomous supply source.

13. The system according to claim 12 wherein the autonomous supply source comprises a rechargeable battery.

14. The system according to claim 1 wherein at least one of the portable terminal and the control unit with which the portable terminal is in data communication are configured in such a way that the movement allowed for the movable structure of the robot, which can be controlled via the manual guide device, can be selectively limited for one or more degrees of freedom.

15. The system according to claim 1 wherein the manual guide device, the portable terminal and the control unit with which the portable terminal is in data communication are configured for the purposes of execution of a procedure of calibration of the manual guide device.

16. The system according to claim 1 wherein the manual guide device comprises a plurality of manually operable controls.

17. The system according to claim 16, wherein the plurality of manually operable controls include at least one ON/OFF key and a key for storage of position co-ordinates.

18. A manual guide device for use with industrial robots, the robots having a structure movable according to a number of degrees of freedom, a control unit, and a portable programming terminal in data communication with the control unit, the manual guide device configured for manually controlling movements of the moveable structure and comprising:
a connection structure for attaching the manual guide device to one said movable structure or an end effector thereof;
a communications system configured for quick interfacing with the portable terminal, the communications system including a first transceiver module of the manual guide device and a second transceiver module removably connected to a communication port of the portable terminal.

19. The manual guide device according to claim 18 wherein the manual guide device is operable for selective use for programming a plurality of robots.

* * * * *